US007748768B2

(12) United States Patent
Hofacker et al.

(10) Patent No.: US 7,748,768 B2
(45) Date of Patent: Jul. 6, 2010

(54) DOOR HINGE FOR MOTOR VEHICLE

(75) Inventors: Dennis Hofacker, Gummersbach-Lantenbach (DE); Jakob Löwen, Gummersbach (DE); Johann Olfert, Bergneustadt (DE)

(73) Assignee: Automotive Group ISE Innomotive Systems Europe GmbH, Bergneustadt (DE)

( * ) Notice: Subject to any disclaimer, the term of this patent is extended or adjusted under 35 U.S.C. 154(b) by 316 days.

(21) Appl. No.: 11/986,704

(22) Filed: Nov. 26, 2007

(65) Prior Publication Data

US 2008/0150320 A1 Jun. 26, 2008

(30) Foreign Application Priority Data

Nov. 29, 2006 (DE) ....................... 10 2006 056 549

(51) Int. Cl.
*B60J 5/00* (2006.01)

(52) U.S. Cl. .................................... 296/146.11; 16/374

(58) Field of Classification Search ............ 296/146.11; 16/374, 376, 380, 381, 386, 387, 389, 392
See application file for complete search history.

(56) References Cited

U.S. PATENT DOCUMENTS

2006/0273621 A1 12/2006 Shaw et al.
2008/0092332 A1* 4/2008 Lowen et al. ................. 16/221
2008/0129082 A1* 6/2008 Krumbiegel et al. ... 296/146.11

FOREIGN PATENT DOCUMENTS

DE 10 2005 017 404 2/2006

* cited by examiner

*Primary Examiner*—Lori L Lyjak
(74) *Attorney, Agent, or Firm*—Bachman & LaPointe, P.C.

(57) ABSTRACT

A door hinge for a motor vehicle has a column console that can be arranged on a door frame and a door console that can be attached to a vehicle door, wherein the door console and the column console are connected together as counterpieces at two bearing points arranged spaced from each other in a pin-jointed manner and separable for disassembly. In order to provide a motor vehicle door hinge in which the engaged surface are effectively protected from damage, it is provided that at the bearing points the door console or column console has a sliding bushing and the jointed connection is formed by two bolts, each of which extend through a sliding bushing and the associated counterpiece, wherein the sliding bushings and the bolts are arranged on the door or column console and on each other such that in the case of a pivoting of the consoles relative to each other the bolt is rotated relative to the sliding bushing and in the case of disassembly of the column console from the door console the bolt remains in the sliding bushing.

11 Claims, 5 Drawing Sheets

DOOR HINGE FOR MOTOR VEHICLE

BACKGROUND (1) Field of the Invention

The invention relates to a door hinge for a motor vehicle with a column console that can be arranged on a door frame and a door console that can be attached to a vehicle door, wherein the door console and the column console are connected together as counterpieces on two bearing points arranged spaced from each other in a pin-jointed manner and separable for disassembly.

(2) Prior Art

There is already a wide range of motor vehicle door hinges for the installation of a vehicle door on a vehicle body that meet the respective specified constructive requirements and enable a more or less good pin-jointed connection of the vehicle door on the body.

Within the optimization of the vehicle assembly, it has established itself to arrange the vehicle doors using motor vehicle door hinges on the vehicle body before a painting process and to then subject them both to the painting process at the same time. However, the vehicle doors are subsequently removed again from the vehicle body in order to facilitate assembly work on the inside of the vehicle as well as the fitting of the vehicle doors with components to be installed. A generic motor vehicle door hinge of the initially mentioned type is e.g. known from DE 20 2005 017 404 U1.

The repeated assembly and disassembly of the door hinges, which is usually performed in the area of door and column console components moving relative to each other, can damage the contact surfaces. This can result in a wrong door position, loss of ease of use of the door or a complete failure of the door hinge.

SUMMARY OF THE INVENTION

The object of the invention is to provide a motor vehicle door hinge in which the engaged surfaces are effectively protected from damage.

The object is solved by the invention through a motor vehicle door hinge with the characteristics of claim 1. Advantageous further embodiments of the invention are specified in the dependent claims.

The column console and the door console of the motor vehicle door hinge according to the invention are connected together in a pin-jointed manner on two bearing points arranged spaced from each other. For this, the motor vehicle door hinge has a sliding bushing at each bearing point, which is fastened to the door console or the column console. Following the constructive framework conditions, both sliding bushings can thereby be arranged both only on the column console or only on the door console, but also distributed, i.e. one in the door and one in the column console.

A bolt, which extends beyond the sliding bushings at the respective bearing point through the corresponding counterpiece, i.e. the corresponding area of the door or column console, is arranged in each of the sliding bushings so that the door and column console are pin-jointed together at the bearing points. The contact surfaces are thereby formed through a section of the bolt and the adjacent interior surface of the sliding bushing. In order to separate the motor vehicle door hinge, one just needs to lift the door or column console from the bolt area projecting out of the sliding bushings.

The connection between the sliding bushing and the bolt arranged in the sliding bushing is not removed during the assembly or disassembly of the door hinge (separation of the door console from the column console). The contact surfaces of the sliding bushings and the bolts are thus particularly well protected from dirt and damage both in the installed and uninstalled state as well as during the painting process.

For the connection with the counterpiece of the door or column console, the bolt can generally be designed in any manner, as long as it is possible to remove the connection for the separation of the vehicle door hinge. However, in accordance with an advantageous further embodiment of the invention, the bolt has a sliding bushing section as well as a stud for the arrangement of a stud collet of the counterpiece of the door and column console on the bolt. When the bolt has been installed, the sliding bushing section is attached to the sliding bushing in the area of the sliding bushing and its surface forms the contact surface for the interior surface of the sliding bushing. In order to receive the counterpiece of the door or column console, the bolt has a stud extending over and beyond the sliding bushing section that is arranged in a corresponding stud collet of the counterpiece for the assembly of the door hinge. The use of a stud makes it possible to disassemble or assemble the door hinge in a particularly simple manner, namely by lifting from the stud or placing on the stud. An otherwise designed, complicated fastening of the counterpieces on the bolt can thus be avoided effectively.

The shape of the stud can generally be freely selected. However, in accordance with another embodiment of the invention, the stud has a cross-section deviating from a circular form, preferably polygonal, and the stud collet has a corresponding cross-section. This design of the stud collet and the stud makes it possible to arrange the counterpieces, i.e. the door or column console, on the bolt in a particularly easy and torque-proof manner. Potential examples are rectangular cross-sections of the stud, but also a profiled shape, whereby a reliable form fit can be produced.

In accordance with a further embodiment of the invention, the stud is designed conically and the stud collet is accordingly conical. A corresponding embodiment of the stud causes an independent centering of the counterpieces on the studs and facilitates the assembly of the counterpieces on the studs. The conical design can extend over both the entire stud area or only over partial areas of the stud. Conical also means a design of the stud that has a curved shape in some sections or that is designed like a spherical cap on the end.

As long as the door console—from the top in the standard position—is placed on the studs during the assembly of the motor vehicle door hinge, an additional securing of the position is generally unnecessary due to the existing weight. In order to increase the securing of the installed state of the motor vehicle door hinge, it is however provided according to a further embodiment of the invention that the stud has an internal thread for receiving a screw. The internal thread accessible from the bolt end lying opposite the sliding bushing section enables that the counterpieces can be fixed on the stud in a lift-proof manner. For disassembly, it is then stringently necessary to first loosen the screw so that the counterpieces can be lifted from the stud. Both bearing points or just one bearing point can be provided with a screw.

In order to ensure a connection between the bolt and the sliding bushing that is independent of the screw connection, i.e. of the fastening torque, the sliding bushing section and the stud are separated from each other by a circumferential bar in accordance with another embodiment of the invention, wherein the diameter of the bar is greater than the diameter of the stud collet. In the case of a screw connection, this further embodiment of the invention ensures that the fastening torque of the screw does not lead to warping in the area of the sliding bushing section. Through the screw connection, the counterpiece is only fixed between the bar, which rests against the sliding bushing on one side, and the screw. The requirement of a special fastening torque during assembly can thus be omitted, whereby assembly is further facilitated.

For the rotatable arrangement of the bolt with its sliding bushing section in the sliding bushing, all conventional fastening procedures can generally be used. It is conceivable e.g. to produce a corresponding welding connection, whereby attention must be paid to the created heat introduction to the components. In accordance with a particularly advantageous embodiment of the invention, it is however provided for the rotatable arrangement of the bolt in the sliding bushing that the bolt is fixed in a rotatable manner through a rivet connection with the door or column console in the sliding bushing. The rivet connection is produced after the bolt is arranged in the sliding bushing. The rivet connection, which is particularly easy to produce, secures in a particularly reliable manner the position of the bolt in the sliding bushing collet, wherein it can be ensured in a particularly reliable manner during the production of the rivet connection that the bolt can be turned in the sliding bushing. In accordance with a further embodiment of the invention, the securing of the rivet connection can be enhanced by providing a disk, which is arranged between a rivet head and the door or column console.

With respect to the arrangement of the sliding bushings on the corresponding sliding bushing collets on the door and column console, generally known methods for fastening sliding bushings in components can be used. However, in accordance with a particularly advantageous embodiment of the invention, the sliding bushing has when installed on its opposite-lying ends a circumferential collar resting on the door or column console. The collar secures the position of the sliding bushing in the sliding bushing collets in an enhancing manner and also serves as a bearing surface and sliding surface for a rivet head bottom side or e.g. the circumferential bar to be advantageously provided on the bolt.

The production of the door or column console as well as the stud and sliding bushing collets to be provided can also generally take place in any manner. However, in accordance with a particularly advantageous embodiment of the invention, the stud collets and the sliding bushing collets are produced using die cutters, even more advantageously using fine die cutters. The embodiment of the motor vehicle door hinge according to the invention makes it possible to produce these collets with these particularly cost-effective production methods since the engaged surfaces are formed by the sliding bushing inserted into the sliding bushing collet and the bolt arranged therein. Thus, an increased surface quality of the sliding bushing collet and stud collet is not needed.

As already illustrated initially, a person skilled in the art can choose, depending on the constructive requirements, where to arrange the sliding bushing on the two bearing points and in which direction the area of the bolt provided to connect with the counterpiece should extend. However, in accordance with a further embodiment of the invention, a sliding bushing is arranged in the column console at a first bearing point and a sliding bushing is arranged in the door console at a second bearing point and the studs of the bolts arranged in the sliding bushings extend in opposite directions, preferably apart from each other. By this embodiment of the invention, in which a stud projects out of the door console during assembly and is inserted into the counterpiece of the column console and a stud projects out of the column console and is inserted into the counterpiece of the door console, it is ensured that a screwed connection to be provided if necessary is accessible from the outside of the hinge. This embodiment of the invention thus facilitates in a special manner the assembly and disassembly of the motor vehicle door hinge.

BRIEF DESCRIPTION OF THE DRAWINGS

An exemplary embodiment of the invention is described in greater detail below using the drawings.

DETAILED DESCRIPTION OF THE PREFERRED EMBODIMENT(S)

Figure 1:
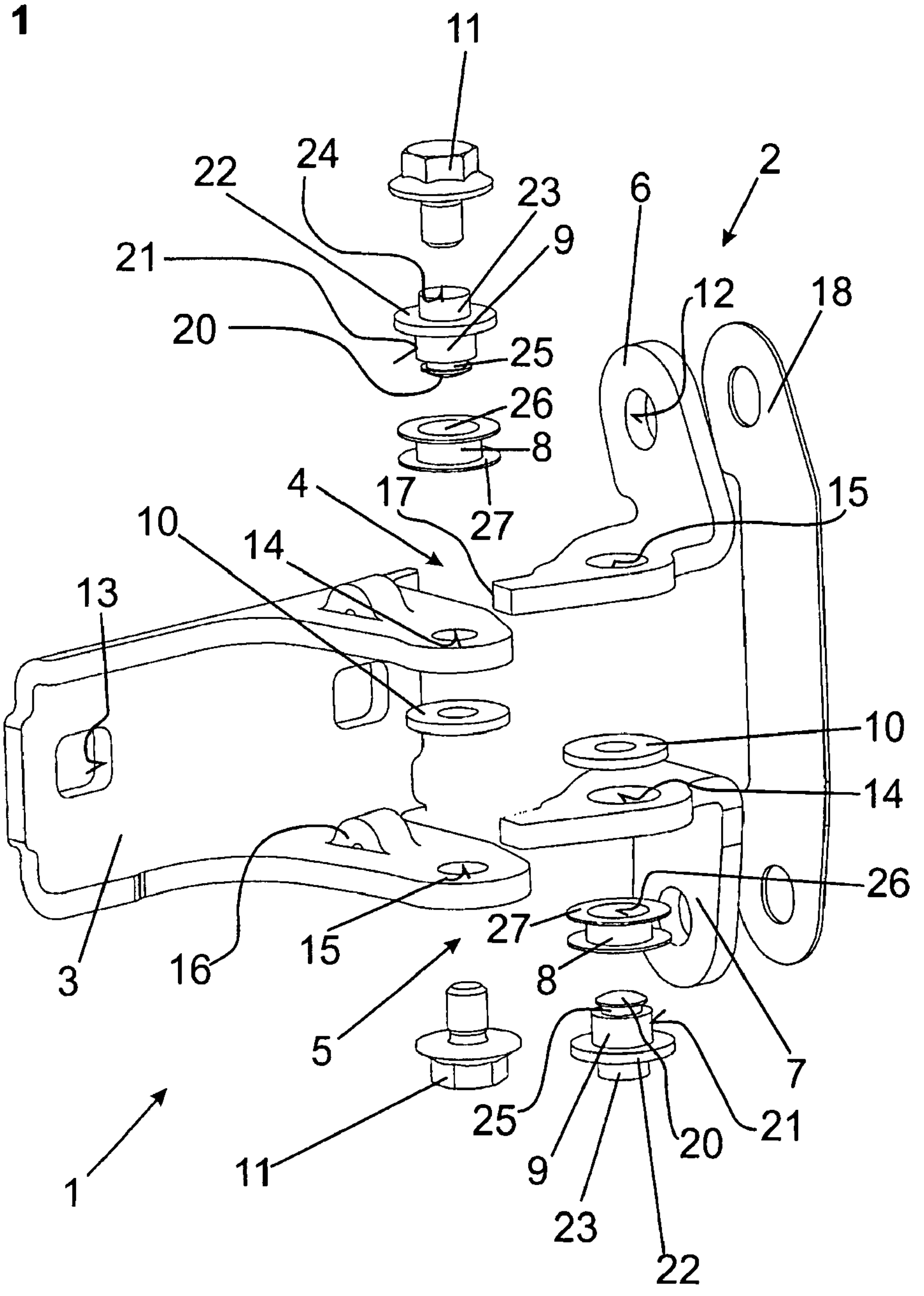
FIG. 1 shows an exploded view of a motor vehicle door hinge.

FIG. 1 shows an exploded view of a motor vehicle door hinge 1 with a door console 2 and a column console 3, wherein the door console 2 is formed from an upper partial unit 6 and a lower partial unit 7, which are connected with each other in the assembled state on a door (not shown) via a connection plate 18.

The representation of the individual components selected in FIG. 1 corresponds with their form in the assembled state and not their form before the initial assembly of the motor vehicle door hinge 1. The door console 2 and the column console 3 of the motor vehicle door hinge 1 are pin-jointed together at two bearing points 4, 5. For this, the column console 3 has a sliding bushing 8 at its first bearing point 4, which is arranged in a torque-proof manner in a sliding bushing collet 14 of the column console 3. At the second bearing point 5, the sliding bushing 8 is arranged in the sliding bushing collet 14 of the bottom partial unit 7 of the door console 2. For the jointed connection of the door console 2 with the column console 3, a bolt 9 is arranged in a rotatable manner in the sliding bushing 8 in the area of its sliding bushing collet 21.

The sliding bushings 8 have on their opposite ends a circumferential, flattened collar 27, which rests against the door or column console 2, 3.

In order to secure the position of the bolt 9 in the sliding bushing 8, the bolt 9 has on its free end of the sliding bushing 21 a tapered area 25. This serves to receive a disk 10 and to form a rivet head 20, the diameter of which is greater than an opening of the disk 10, so that the bolt 9 is fixed in the sliding bushings 8 in an irremovable but rotatable manner.

For the jointed connection of the door console 2 with the column console 3, the bolt 9 has a stud 23 on the end opposite the rivet head 20 that extends from a bar 22 located in the area between the sliding bushing section 21 and the stud 23 up to the end of the bolt 9 opposite the rivet head 20.

The counterpieces of the door console 2 or column console 3 lying opposite the sliding bushings 8 have stud collets 15 for receiving the studs 23 so that the door console 2 and the column console 3 are connected together at the two bearing points 4, 5.

In the assembled state of the motor vehicle door hinge 1, the contact surfaces are formed by a sliding surface 26 and the sliding bushing section 21 of the bolt 9. In order to secure the position of the assembled state, the studs 23 also have an internal thread 24, which is suitable for receiving a screw 11. The screws 11 can be screwed into the studs 23 of the bolts 9 and thus prevent the door console 2 and the column console 3 from separating from each other accidentally.

In order to fasten the motor vehicle door hinge 1 to a motor vehicle body or a vehicle door, the door console 2 and the column console 3 have provided fastening openings 12, 13, which are provided for receiving fastening screws (not shown here). In order to restrict the opening angle, i.e. the pivoting angle, of the door console 2 with respect to the column console 3, the column console 3 has a stop 16, which is developed from the column console 3. When the maximum opening angle is reached, the stop 16 moves up against the upper and lower partial unit 6, 7 of the door console 2 with a stop 17.

Figure 2:
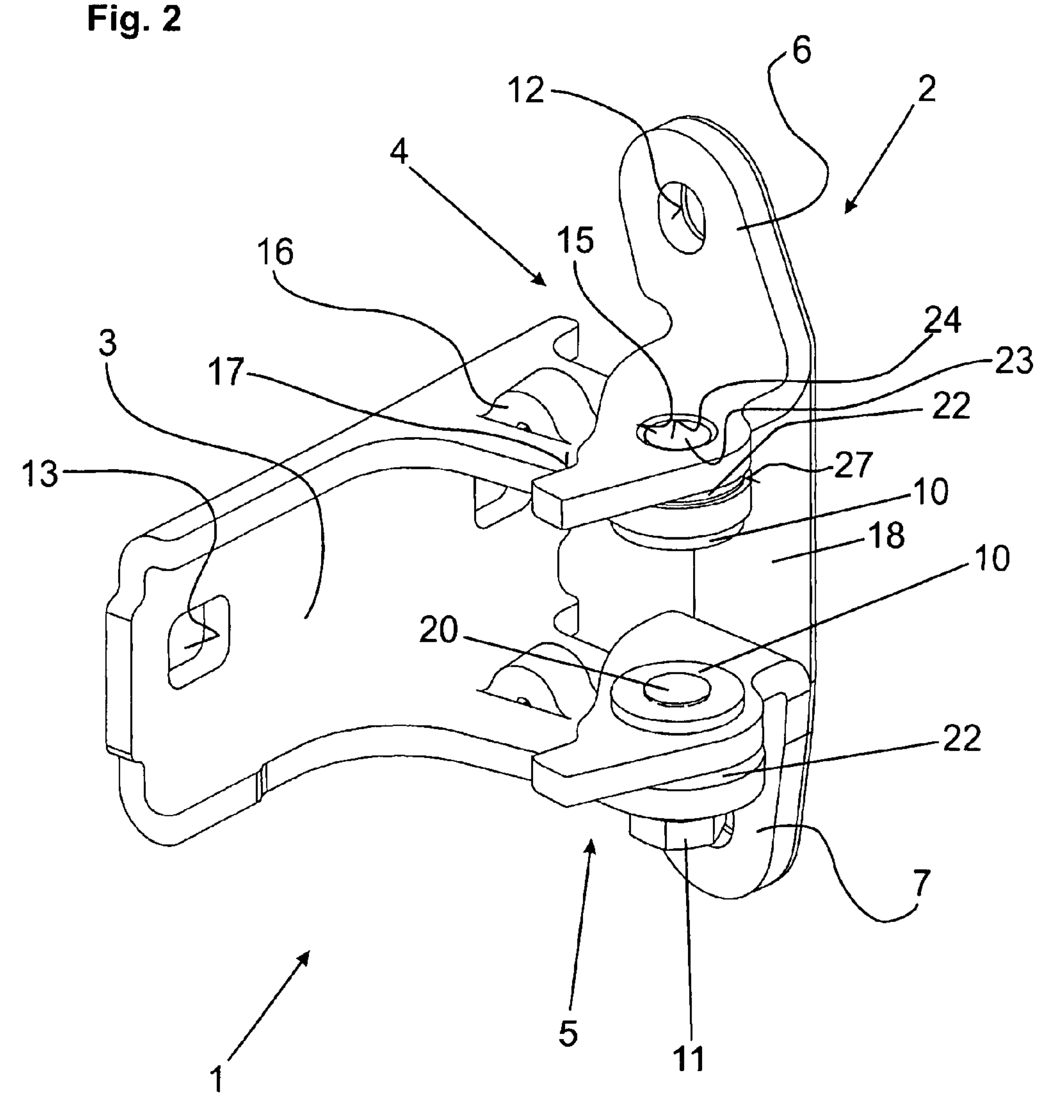
FIG. 2 shows a perspective view of the motor vehicle door hinge from FIG. 1 with a screw connection.

In the exemplary embodiment of the motor vehicle door hinge 1 shown in FIG. 2, a fastening screw 11 is not needed at the first bearing point 4. The securing of the position at this point is unnecessary, since the screw 11 arranged at the second bearing point 5 sufficiently secures the door console 2 on the column console 3.

Figure 3:
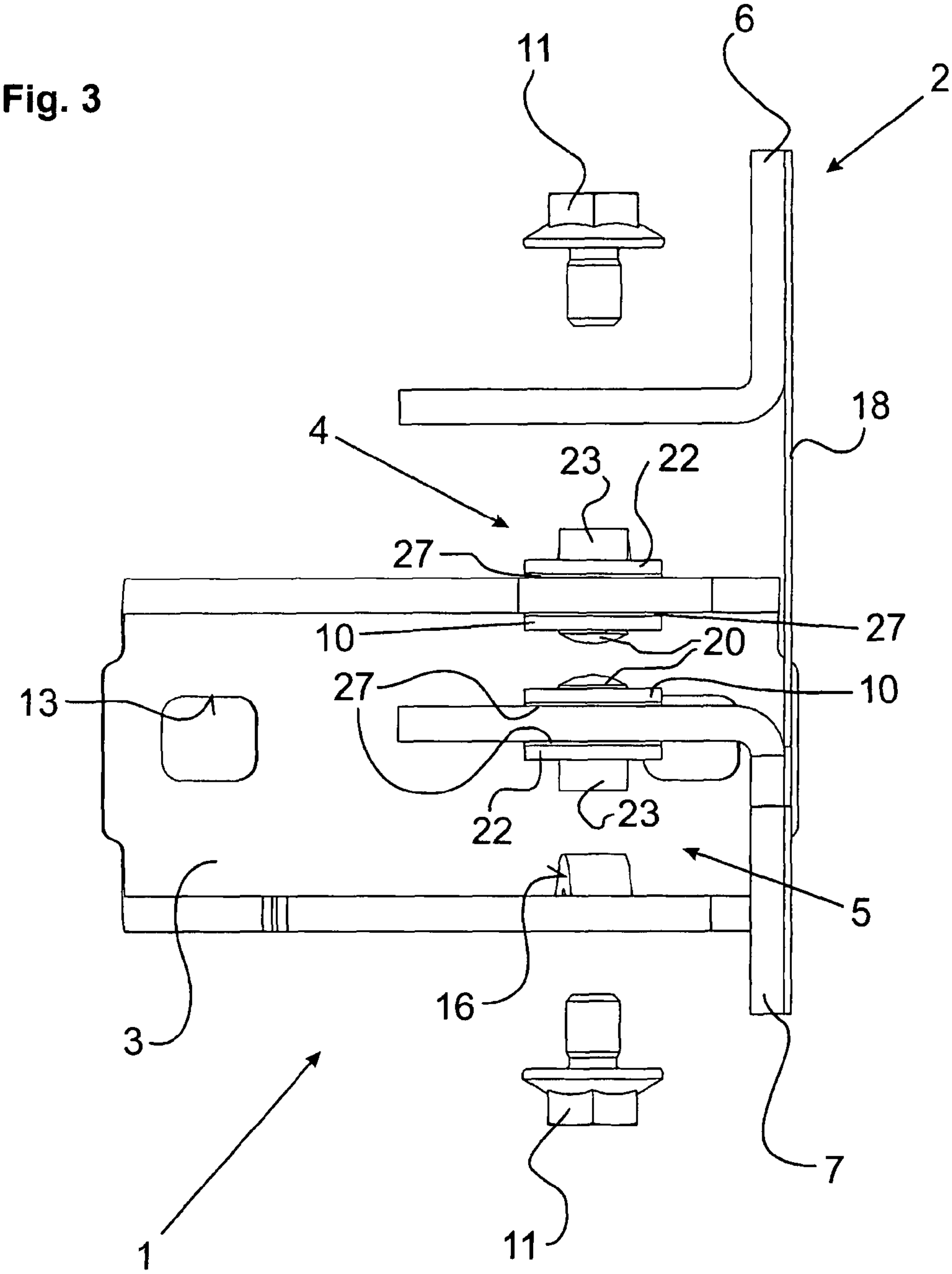
FIG. 3 shows a side view of the motor vehicle door hinge from FIG. 1 in the disassembled state.
Figure 4:
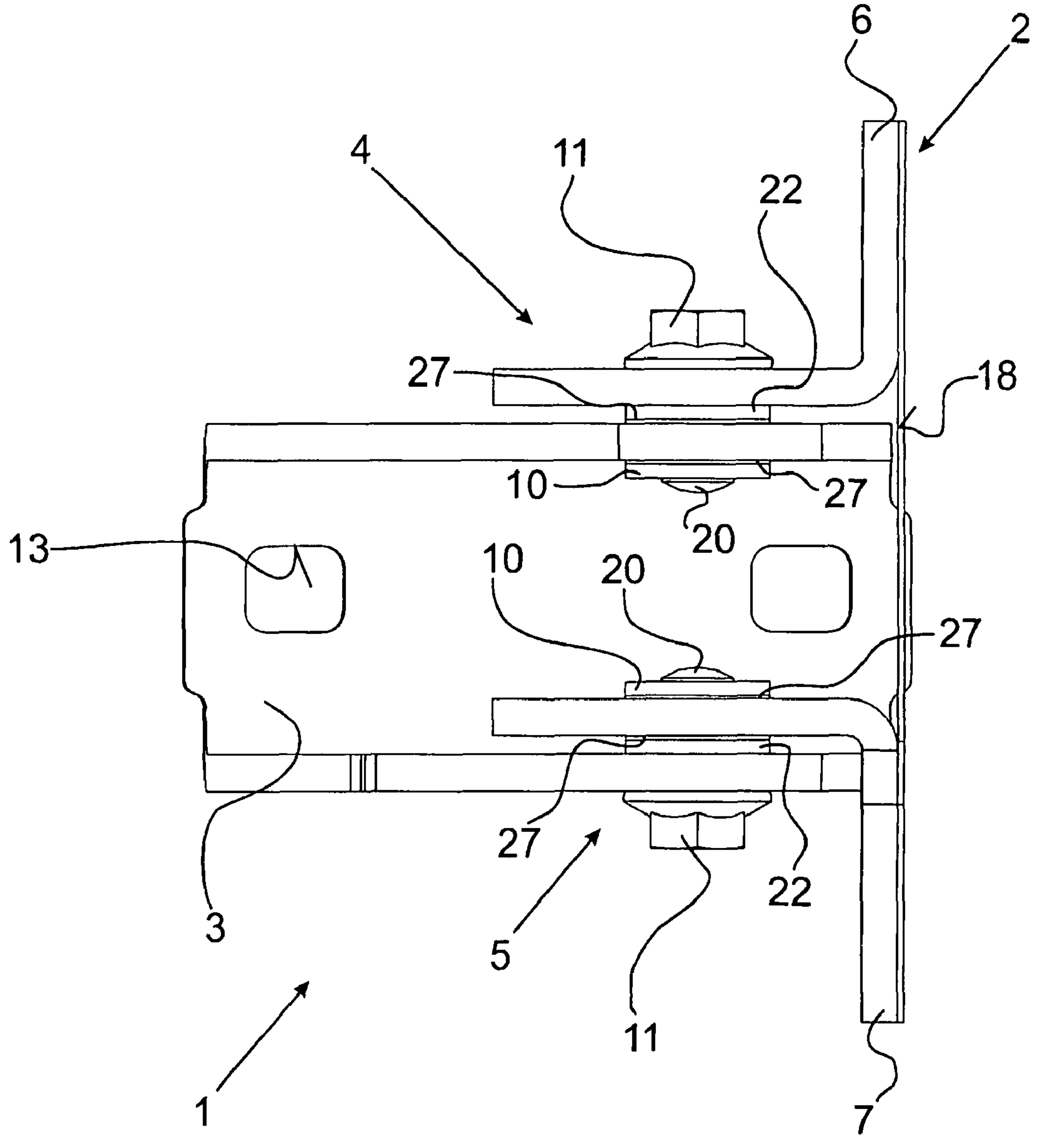
FIG. 4 shows a side view of the motor vehicle door hinge from FIG. 1 in the assembled state.

In FIGS. 3 and 4, the motor vehicle door hinge 1 is shown in the assembled (FIG. 4) and in the disassembled (FIG. 3) state. For separation, one just needs to lift the screws 11 from the ends of the bolts 9 opposite the rivet heads 20 and the door console 2 from the column console 3. The opposite sequence should be followed for assembly. The door console 2 is thereby connected with the column console 3 such that the stud collet 15 is placed on the upper partial unit 6 on the stud 23 at the first bearing point 4 and the stud 23 at the second bearing point 5 into the stud collet 15 at the second bearing point 5 of the column console 3.

Figure 5:
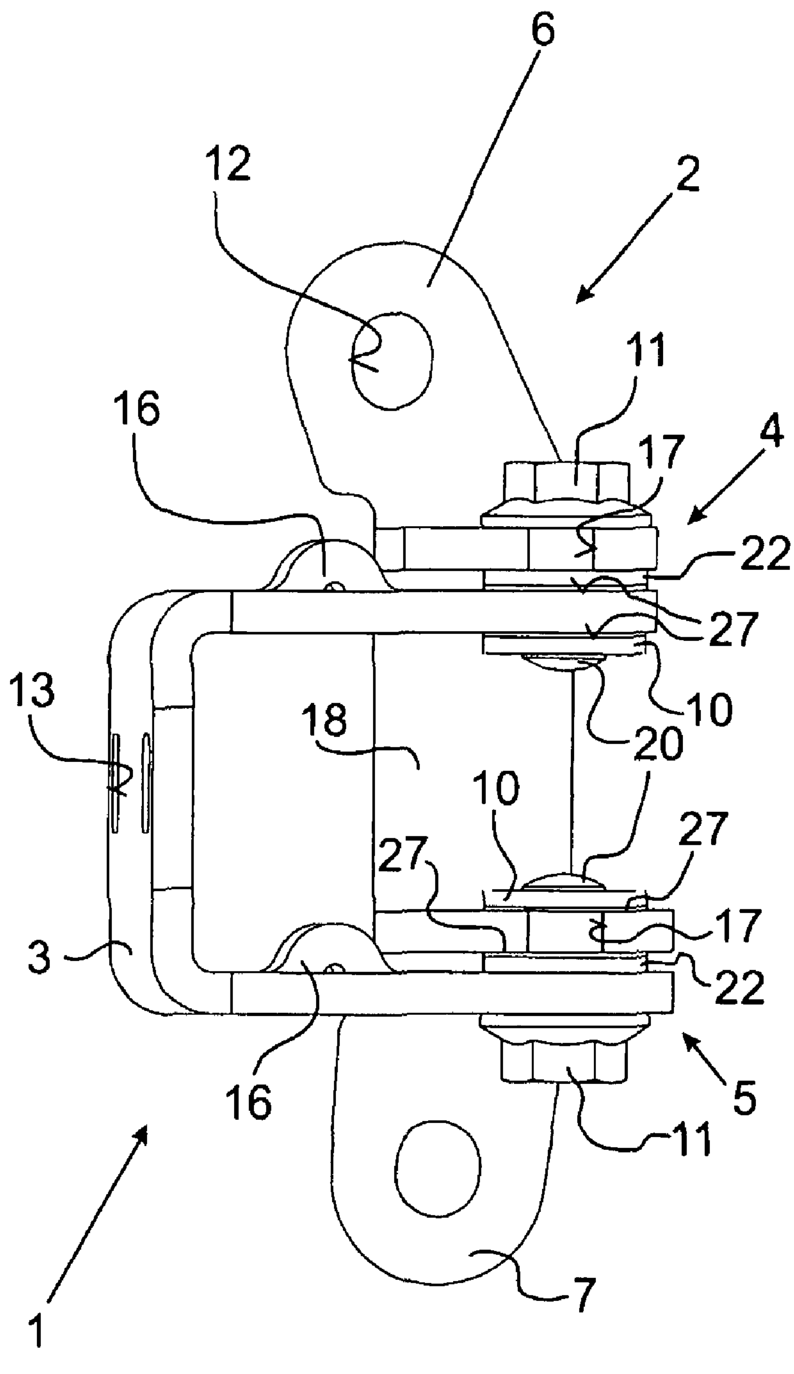
FIG. 5 shows another view of the motor vehicle door hinge from FIG. 1 in the assembled state.

FIG. 5 shows a different view of the column console 3 of the motor vehicle door hinge 1 from FIG. 1 with respect to the door console 2.

What is claimed is:

1. A door hinge for a motor vehicle comprising:

a column console that can be arranged on a door frame; and a door console that can be attached to a vehicle door;

wherein the door console and the column console are connected together as counterpieces at two bearing points arranged spaced from each other in a pin-jointed manner and separable for disassembly, wherein, at the bearing points the door console or the column console has a sliding bushing and a jointed connection formed by two bolts and each said bolt extending through a sliding bushing and an associated counterpiece, and wherein the sliding bushing and the bolts are arranged on the door console or column console and on each other such that, in the case of a pivoting of the consoles relative to each other, the bolt is rotated relative to the sliding bushing and, in the case of disassembly of the column console from the door console, the bolt remains in the sliding bushing.

2. The door hinge for a motor vehicle according to claim 1, wherein at least one of the bolts has a sliding bushing section and a stud for the arrangement of a stud collet of the counterpiece of the door console or column console on the at least one bolt.

3. The door hinge for a motor vehicle according to claim 2, wherein the stud has a cross-section deviating from a circular form and the stud collet has a corresponding cross-section.

4. The door hinge according to claim 3, wherein said cross-section is polygonal.

5. The door hinge for a motor vehicle according to claim 2, wherein the stud is designed conically and the stud collet is designed conical.

6. The door hinge for a motor vehicle according to claim 2, wherein the stud has an internal thread for receiving a fastening screw.

7. The door hinge for a motor vehicle according to claim 2, wherein the sliding bushing section and the stud are separated from each other by a circumferential bar, and wherein the bar has a diameter greater than a diameter of the stud collet.

8. The door hinge for a motor vehicle according to claim 2, wherein at least one of the bolts is fixed in a rotatable manner by a rivet connection with the door console or column console in the sliding bushing.

9. The door hinge for a motor vehicle according to claim 8, wherein a disk is arranged between a rivet head and the door console or column console.

10. The door hinge for a motor vehicle according to claim 2, wherein the stud collet and a sliding bushing collet are produced by blanking.

11. The door hinge for a motor vehicle according to claim 1, wherein at a first bearing point, a first sliding bushing is arranged in the column console and at a second bearing point, a second sliding bushing is arranged in the door console and the studs of the bolts arranged in the sliding bushings extend in opposite directions, away from each other.

* * * * *